US012697983B2

(12) United States Patent
Do

(10) Patent No.: US 12,697,983 B2
(45) Date of Patent: Aug. 4, 2026

(54) METHOD FOR AUTONOMOUSLY CONTROLLING AN ACTUATOR OF A DEVICE

(71) Applicants: AMPERE S.A.S., Boulogne Billancourt (FR); NISSAN MOTOR CO., LTD., Kanagawa (JP)

(72) Inventor: Anh-Lam Do, Guyancourt cedex (FR)

(73) Assignees: AMPERE S.A.S., Boulogne Billancourt (FR); NISSAN MOTOR CO., LTD., Kanagawa (JP)

( * ) Notice: Subject to any disclaimer, the term of this patent is extended or adjusted under 35 U.S.C. 154(b) by 46 days.

(21) Appl. No.: 18/693,456

(22) PCT Filed: Aug. 19, 2022

(86) PCT No.: PCT/EP2022/073224
§ 371 (c)(1),
(2) Date: Mar. 19, 2024

(87) PCT Pub. No.: WO2024/037725
PCT Pub. Date: Feb. 22, 2024

(65) Prior Publication Data
US 2025/0136124 A1 May 1, 2025

(30) Foreign Application Priority Data
Sep. 20, 2021 (FR) ...................................... 2109851

(51) Int. Cl.
B60W 50/00 (2006.01)
B60W 10/18 (2012.01)
B60W 10/20 (2006.01)

(52) U.S. Cl.
CPC ........ B60W 50/0098 (2013.01); B60W 10/18 (2013.01); B60W 10/20 (2013.01);
(Continued)

(58) Field of Classification Search
CPC .. B60W 50/0098; B60W 10/18; B60W 10/20; B60W 2050/0028; B60W 2520/10;
(Continued)

(56) References Cited

U.S. PATENT DOCUMENTS

2011/0276227 A1* 11/2011 Sugawara ............ B62D 15/025
701/41
2015/0329140 A1 11/2015 Tamaizumi
(Continued)

FOREIGN PATENT DOCUMENTS

EP 2 338 758 B1 8/2015
EP 2 949 546 A2 12/2015
(Continued)

OTHER PUBLICATIONS

International Search Report Issued Mar. 14, 2023, in PCT/EP2022/073224, filed on Aug. 19, 2022, 2 pages.

*Primary Examiner* — Yi-Kai Wang
(74) *Attorney, Agent, or Firm* — Oblon, McClelland, Maier & Neustadt, L.L.P.

(57) ABSTRACT

A method autonomously controls at least one actuator of an automotive device. The actuator has an influence on the trajectory of the automotive device. The method includes acquiring parameters relating to the trajectory of the automotive device and to the speed of the automotive device, and having a computer calculate a control setpoint for each actuator, as a function of the parameters, using a controller. The controller used varies according to the speed of the vehicle.

11 Claims, 4 Drawing Sheets

(52) U.S. Cl.
CPC . *B60W 2050/0028* (2013.01); *B60W 2520/10*
(2013.01); *B60W 2710/18* (2013.01); *B60W*
*2710/20* (2013.01)

(58) Field of Classification Search
CPC ......... B60W 2710/18; B60W 2710/20; B60W
30/09
USPC .......................................................... 701/41
See application file for complete search history.

(56) References Cited

U.S. PATENT DOCUMENTS

| | | | | |
|---|---|---|---|---|
| 2016/0362136 | A1* | 12/2016 | Oya ..................... | B62D 5/0454 |
| 2020/0180693 | A1* | 6/2020 | Suzuki ................... | B60R 11/04 |
| 2022/0001860 | A1 | 1/2022 | Do | |

FOREIGN PATENT DOCUMENTS

| | | | |
|---|---|---|---|
| EP | 3 106 366 | B1 | 3/2018 |
| JP | 2018-20627 | A | 2/2018 |
| WO | WO 2020/099098 | A1 | 5/2020 |

* cited by examiner $E_1 = \varepsilon(P, \mu^{-1})$ $S_2(x, \psi_{1'}, v)$ $E_0 = \varepsilon(P, \mu^{-1} - \sigma^{-1})$

T2

$S_2(x, \psi_{1'}, v)$ $S_1(x, \eta)$

METHOD FOR AUTONOMOUSLY CONTROLLING AN ACTUATOR OF A DEVICE

FIELD OF THE INVENTION

The present invention relates in general to the automation of trajectory following in automotive devices.

It finds a particularly advantageous application in the context of motor vehicle driving aids but may also be applied to the field of aeronautics or robotics.

It relates more particularly to a method for autonomously controlling at least one actuator of an automotive device which is able to influence the trajectory of said automotive device, comprising steps of:

acquiring parameters relating to the trajectory of the automotive device, and calculating, using a computer, a control setpoint for each actuator, as a function of said parameters, using a controller.

It also relates to a device equipped with a computer able to implement this method.

It applies more particularly, although not exclusively, to motor vehicle obstacle avoidance trajectory following.

PRIOR ART

With a view to making motor vehicles safer, such vehicles are currently equipped with driving aid systems or with autonomous driving systems.

Such systems notably include automatic emergency braking systems (better known by their abbreviation AEB) which are designed to avoid any collision with obstacles lying in the path taken by the vehicle, by simply acting on the conventional braking system of the motor vehicle.

However, there are situations in which these emergency braking systems are unable to avoid a collision or cannot be used (for example if there is a vehicle following very closely behind said motor vehicle).

For such situations, automatic evasive steering or automatic emergency steering systems (better known by their abbreviation AES) have been developed and allow the obstacle to be avoided by diverting the vehicle off its trajectory, either by acting on the vehicle steering or by acting on the differential braking system of the vehicle. It will be noted that the obstacle may be in the same lane as the vehicle or in an adjacent lane, in which case it is detected that this obstacle may very shortly come to be on the trajectory of the vehicle.

However, sometimes the AES system imposes on the vehicle a trajectory that is at the limit of controllability and does not allow the driver to take back control of the vehicle in complete safety.

Thus, document FR3099450 describes a solution that consists in using a controller to generate a control setpoint that is such that the vehicle remains controllable by the driver of the vehicle should the latter wish to take back control during the avoidance procedure. For that, the controller limits the amplitude and the rate of change of direction imposed on the motor vehicle, by means of hyperbolic tangent functions. This solution, although effective in numerous configurations, does have scope for improvement its performance (namely its correct following of the avoidance trajectory).

More specifically, it is desirable to find a solution that guarantees the performance and robustness, in terms of stability, of the vehicle when its speed changes, this notably being manifested in:

correct following of heading and positioning throughout the avoidance trajectory, good stability.

SUMMARY OF THE INVENTION

To that end the invention proposes a control method as defined in the introduction, wherein the controller used varies as a function of the speed of the vehicle (which here means the speed of the vehicle relative to the road, which speed may have a longitudinal component along the axis of the vehicle and a lateral component).

More specifically, the controller varies continuously as a function of the vehicle speed.

Thus, by virtue of the invention, the controller used will not be the same irrespective of the vehicle speed, and this will allow the control law for the actuators to be adapted to best suit the dynamics of the vehicle. Such a solution performs well. Specifically, the better the controller is suited to the situation (namely the fewer eventualities that have to be considered), the more latitude it will have to control the vehicle, and this will enable it to avoid the obstacle in the way that is safest and most comfortable for the passengers.

This solution proves to be particularly important in the context of the use of differential braking (in addition to steering). This is because, in such a context, the vehicle speed is continuously changing (decreasing) throughout the avoidance trajectory, and this has an appreciable influence on the behavior of the vehicle.

Other features of the invention afford other advantages.

Thus, the solution described hereinafter will allow hybrid control of the steering and of the differential braking. Specifically, the (raw, before saturation) steering setpoint is calculated not only on the basis of the dynamic variables of the vehicle, of the measured steering angle and of the saturated steering setpoint, but also on the basis of the saturated yaw moment setpoint and of the measured (or estimated) yaw moment, and vice versa. That makes it possible to have good coherence between the two command setpoints (as these are mutually dependent on one another).

The structure of the proposed controller is simple, which means that this controller is inexpensive to use, notably in terms of computing power.

It is simple to optimize since this consists simply in solving a system of linearized matrix inequations, having previously set values for certain parameters (the minimum and maximum vehicle speed in the case of the AES function, the minimum and maximum curvatures of the avoidance trajectory . . . ).

This controller can vary as a function of the curvature of the avoidance trajectory, in such a way as to be well-suited to the situation.

This controller is able to maximize the performance and robustness of the effective trajectory of the vehicle, within the limits of controllability of the vehicle.

As has already been mentioned, the method used yields good performance, namely correct following of position and of heading, thereby allowing the vehicle, with greater precision, to follow the avoidance trajectory which has been calculated for avoiding the obstacle.

The claimed solution also affords great stability so long as the energy of the disturbances is not unbounded, notably namely as long as the trajectory that is to be followed has a curvature that remains within an acceptable boundary. In other words, this solution makes it possible to determine quickly whether the calculated avoidance trajectory can be achieved by the vehicle in terms of dynamics so that the AES function is activated only when such is indeed the case.

More specifically, if a characteristic of the trajectory crosses a predetermined threshold, provision may be made for the AES function not to be activated. The idea is therefore not to deactivate the AES function retrospectively, but rather to choose beforehand whether or not to activate it, thus making it possible to anticipate instances in which the system would potentially be unstable and instances in which the trajectory produced would be too imperfect (too much overshoot, excessive oscillations, etc.).

According to the invention, the controller operates even if the initial states of the vehicle at the moment of triggering of the AES function are non-zero (initial heading, initial yaw velocity, etc.), which is something that happens when the vehicle already has a certain dynamic behavior (for example because it is cornering at the moment of triggering of the AES obstacle avoidance function), something which is not the case with the solution described in document FR3099450. In order to achieve this result, the controller is synthesized to consider the initial states of the vehicle.

Other advantageous and nonlimiting features of the method according to the invention, considered individually or in any technically possible combination(s), are as follows:

said automotive device is a vehicle comprising wheels, a power steering actuator and a differential braking actuator;

the controller comprises several components for determining a control setpoint for said power steering actuator and a control setpoint for said differential braking actuator;

the controller comprises several components, including at least one state return gain to be applied to said parameters and at least one saturation compensation gain to be applied to a value of the control setpoint which was determined in a preceding iteration;

the controller can be written in the form of a sum of a plurality of products of a variable dependent on the speed and of a local controller independent of the speed;

each local controller is determined for a determined value of a vector of two varying (scheduling) parameters, one of said varying (scheduling) parameters preferably being equal to the speed V of the vehicle and the other of said varying (scheduling) parameters being preferably equal to the inverse of said speed;

the controller conforms to at least one saturation function being modeled per non-linear sector;

the saturation function conforms to a setpoint amplitude limiter model and can be expressed in the form:

$$\psi_1(x)=sat_\eta(K(\rho)\cdot x)-K(\rho)\cdot x$$

the saturation function conforms to a model limiting the variation in control setpoint and can be expressed in the form:

$$\psi_2(x)=sat_v(A_1x+B_1sat_\eta(K(\rho)\cdot x))-(A_1x+B_1sat_\eta K(\rho)\cdot x),$$

where K is the controller, $sat_v$ is an amplitude limiting function, A1 and B1 are predetermined matrices, and x is a state vector of said automotive device comprising said parameters;

the controller conforms to a modeling of said device in which one output to be minimized is a function of a trajectory-following error and of a heading angle error;

provision is made to calculate a parameter relating to the curvature of said trajectory and then provision is made for said calculation step to be implemented on condition that said parameter is comprised within a predetermined interval;

the control setpoint for said power steering actuator is calculated as a function of a previously calculated control setpoint for said differential braking actuator;

the control setpoint for said differential braking actuator is calculated as a function of a previously calculated control setpoint for said power steering actuator.

The invention also proposes an automotive device comprising at least one actuator able to influence the trajectory of said device and a computer for controlling said actuator, which computer is programmed to implement a method as defined hereinabove.

Naturally, the various features, variants and forms of embodiment of the invention may be combined with one another in various combinations provided that these are not mutually incompatible or mutually exclusive.

DETAILED DESCRIPTION OF THE INVENTION

The following description, with reference to the attached drawings given by way of nonlimiting examples, will make it easy to understand what the invention consists of and how it may be carried out.

Figure 1:
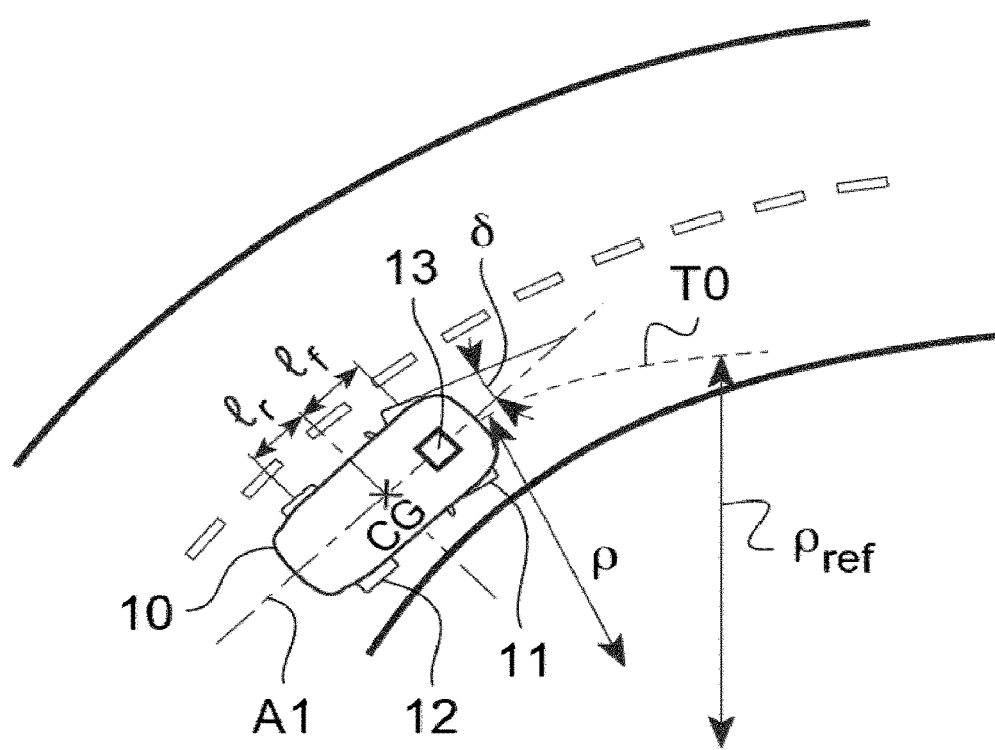
FIG. 1 is a schematic view from above of a motor vehicle traveling along a road and suitable for implementing a method according to the invention.

FIG. 1 depicts a motor vehicle 10 comprising, in the conventional way, a chassis which delimits a cabin, two steered front wheels 11 and two non-steered rear wheels 12. As an alternative, these two rear wheels could also be steered, through an adaptation to the control law.

This motor vehicle 10 comprises a conventional steering system able to act on the orientation of the front wheels 11 so as to be able to cause the vehicle to turn. This conventional steering system notably comprises a steering wheel connected to links in order to cause the front wheels 11 to pivot. In the example considered, it also comprises an actuator able to act on the orientation of the front wheels as a function of the orientation of the steering wheel and/or as a function of a request received from a computer 13. This actuator may, for that purpose, act on the steering column of the vehicle (which column is fixed to the steering wheel) or on a steering rack (which connects the steering column to the steered wheels). Of course, the actuator could be implemented differently.

In addition to this, the motor vehicle comprises a differential braking system able to act differently on the rotational speeds of the front wheels 11 (and where applicable those of the rear wheels 12) so as to slow the motor vehicle while causing it to turn. In the example considered, this differential braking system comprises at least one actuator formed for example of a controlled differential or of electric motors sited at the wheels of the vehicle.

The computer 13 is therefore intended to control the power steering actuator and the actuator of the differential braking system. For that purpose it comprises at least one processor, at least one memory, and various input and output interfaces.

By virtue of its input interfaces, the computer 13 is able to receive input signals originating from various sensors.

These sensors for example include:
- a device such as a front-facing camera, able to identify the position of the vehicle with respect to the lane in which it is traveling,
- a device such as a RADAR or LIDAR remote detector able to detect an obstacle 20 lying on the trajectory of the motor vehicle 10 (FIG. 3),
- at least one lateral device such as a RADAR or LIDAR remote detector able to observe the environment along the sides of the vehicle,
- a device such as a gyrometer, able to determine the rate of rotation in yaw (about a vertical axis) of the motor vehicle 10,
- a steering wheel position and angular velocity sensor, and
- a sensor able to estimate the yaw moment experienced by the vehicle.

In practice, no sensor for measuring the yaw moment is actually provided here. Rather, what is provided is a low-level calculation unit able to estimate the yaw moment as a function of the braking torques applied to the wheels of the vehicle.

By virtue of its output interfaces, the computer 13 is able to transmit a setpoint to the power steering actuator and to the actuator of the differential braking system.

Figure 3:
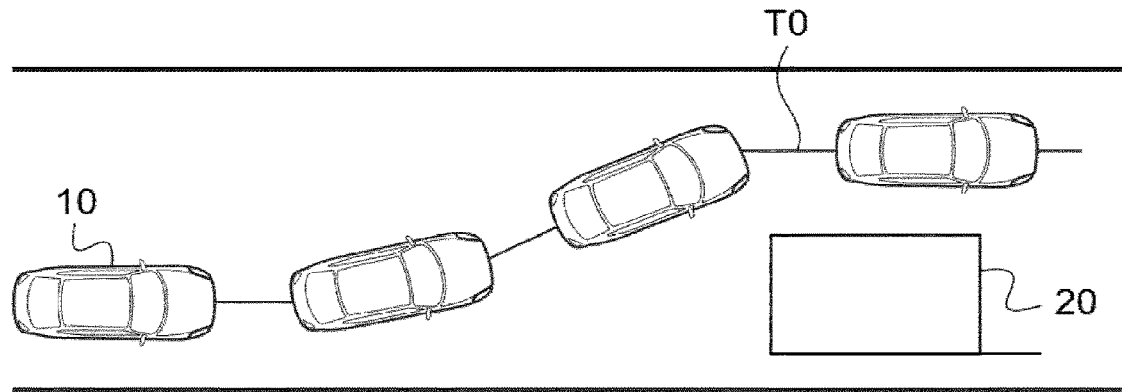
FIG. 3 is a schematic view from above of the motor vehicle of FIG. 1 depicted in four successive positions situated along an obstacle avoidance trajectory.

It is thus able to force the vehicle to follow a predefined avoidance trajectory T0 for avoiding the obstacle 20 (see FIG. 3).

By virtue of its memory, the computer 13 stores data used in the context of the method described hereinbelow.

It notably stores a computer application, consisting of computer programs containing instructions which, when executed by the processor, enable the computer to carry out the method described hereinafter.

Figure 2:
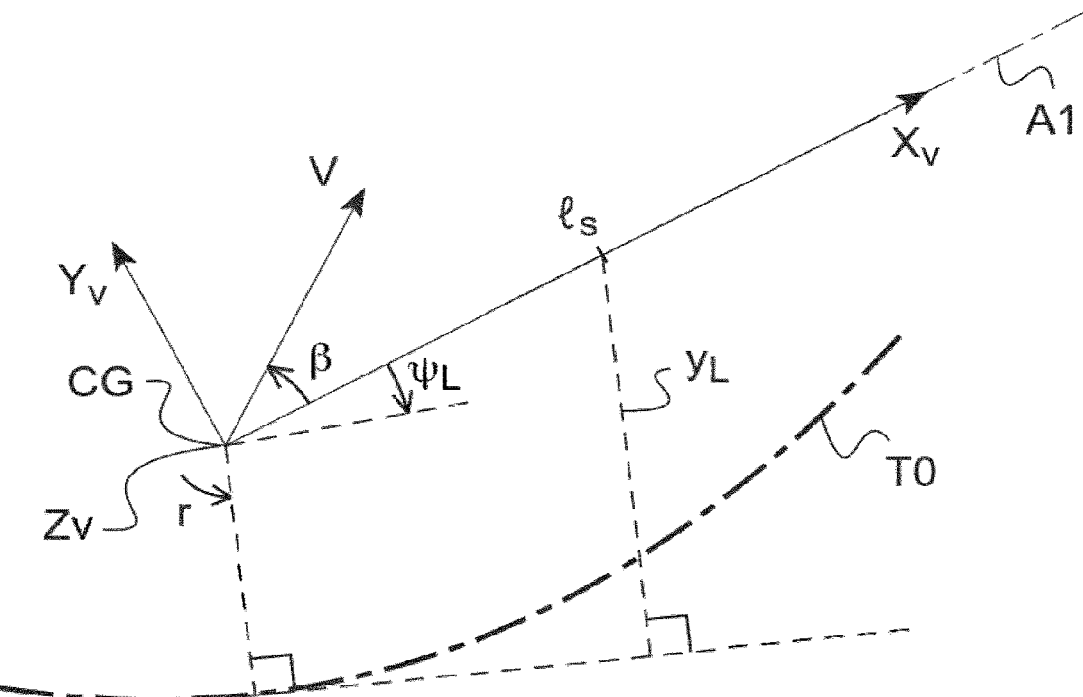
FIG. 2 is a graph illustrating parameters used in the context of the method of FIG. 1.

Before describing this method, an introduction will be given to the different variables that will be used, some of which are illustrated in FIGS. 1 and 2.

The total mass of the motor vehicle will be denoted "m" and expressed in kg.

The moment of inertia of the motor vehicle about a vertical axis passing through its center of gravity CG will be denoted "J" and expressed in N·m.

The distance between the center of gravity CG and the front axle of the vehicle will be denoted "$l_f$" and will be expressed in meters.

The distance between the center of gravity CG and the rear axle will be denoted "$l_r$" and will be expressed in meters.

The cornering stiffness coefficient for the front wheels will be denoted "$C_f$" and will be expressed in N/rad.

The cornering stiffness coefficient for the rear wheels will be denoted "$C_r$" and will be expressed in N/rad.

These cornering stiffness coefficients for the wheels are concepts well known to those skilled in the art. By way of example, the cornering stiffness coefficient for the front wheels is thus that enabling the equation $F_f = 2 \cdot C_f \cdot \alpha_f$, where $F_f$ is the sideslip force for the front wheels and $\alpha_f$ is the slip angle of the front wheels.

The steering angle that the steered front wheels make with the longitudinal axis A1 of the motor vehicle 10 will be denoted "δ" and expressed in rad.

The variable dref, expressed in rad, will refer to the saturated steering angle setpoint, as will be transmitted to the power steering actuator.

The variable δk, expressed in rad, will refer to the unsaturated steering angle setpoint. At this stage, it may merely be specified that the concept of saturation will be associated with limits of steering angle, steering rate which will not necessarily be adhered to with the variable $\delta_K$, but which will be adhered to with the variable $\delta_{ref}$.

The variable $\delta_{sat}$, expressed in rad, will refer to the semi-saturated steering angle setpoint. It is derived from the unsaturated setpoint $\delta_K$ and is saturated in steering angle only. The saturated setpoint $\delta_{ref}$ will be calculated on the basis of this semi-saturated setpoint $\delta_{sat}$.

The orthonormal frame of reference of the vehicle (defined here when the vehicle is on a horizontal surface) will have the vehicle center of gravity CG as its origin. Its abscissa axis $X_v$ will be oriented along the longitudinal axis A1 of the motor vehicle 10, and its ordinate axis $Y_v$ will be oriented laterally, toward the left-hand side of the vehicle. The vertical axis passing through the center of gravity will be denoted $Z_v$.

The yaw moment exerted by the differential braking system about the axis $Z_v$, expressed in N·m, will be denoted $M_z$.

The variable $M_{z\_ref}$, expressed in N·m, will denote the yaw moment setpoint to be applied to the wheels using the differential braking means.

The variable $M_{zK}$, expressed in N·m, will denote the unsaturated yaw moment. At this stage, it may merely be specified that the concept of saturation will be associated with limits of yaw moment, and variations in yaw moment which will not necessarily be adhered to with the variable $M_{zK}$, but which will be adhered to with the variable $M_{z\_ref}$.

The variable $M_{z\_sat}$, expressed in rad, will refer to the semi-saturated yaw moment setpoint. It is derived from the variable $M_{zK}$ and is saturated in amplitude only. The saturated setpoint $M_{z\_ref}$ will be calculated on the basis of this semi-saturated setpoint $M_{z\_sat}$.

The yaw velocity of the vehicle (about the axis passing through the center of gravity CG vertical thereof) will be denoted "r" and expressed in rad/s.

The relative heading angle between the longitudinal axis A1 of the vehicle and the tangent to the avoidance trajectory T0 (the desired trajectory of the vehicle) will be denoted "$\psi_L$" and will be expressed in rad.

The lateral offset between the longitudinal axis A1 of the motor vehicle 10 (passing through the center of gravity CG) and the avoidance trajectory T0, at a sighting distance "ls" situated in front of the vehicle, will be denoted "$y_L$" and expressed in meters.

The setpoint for the lateral offset between the longitudinal axis A1 of the motor vehicle 10 (passing through the center of gravity CG) and the avoidance trajectory T0, at a sighting distance "ls" situated in front of the vehicle, will be denoted "$y_{L\text{-}ref}$" and expressed in meters.

The trajectory-following error will be denoted "$e_{yL}$" and will be expressed in meters. It will be equal to the difference between the lateral offset setpoint $y_{L\text{-}ref}$ and the lateral offset $y_L$.

The aforementioned sighting distance "ls" will be measured from the center of gravity CG and expressed in meters.

The slip angle of the motor vehicle 10 (the angle that the velocity vector of the motor vehicle makes with the longitudinal axis A1 of the vehicle) will be denoted "$\beta$" and expressed in rad.

The speed of the motor vehicle will be denoted "V" and expressed in m/s.

The lateral velocity of the motor vehicle, corresponding to the projection of the vehicle velocity vector onto the axis $Y_y$, will be denoted "$V_y$".

The constants "$\xi$" and "$\omega$" will represent dynamic characteristics of the steering angle for the front wheels of the vehicle.

The constant "g" will be the acceleration due to gravity, expressed in m·s$^{-2}$.

The steering rate will denote the angular velocity of turning of the steered front wheels.

The method according to the invention is intended to allow the vehicle to follow the avoidance trajectory T0 as precisely as possible, autonomously. This method is implemented when an automatic obstacle avoidance AES function has been triggered and then an avoidance trajectory T0 has been calculated. It will be noted that the way in which the AES function is triggered and the avoidance trajectory T0 is calculated do not strictly speaking form part of the subject matter of the present invention and will therefore not be described here.

This method is intended to be implemented in a loop, in successive "iterations" (in this instance, these iterations have a duration of approximately 10 ms).

It will be noted here that the trajectory following is intended to be performed autonomously by the computer 13, but that it also needs to be able to be interrupted at any moment in order to allow the driver to take back control of the vehicle. It also needs to be able to be used as a driving aid when the driver is holding the steering wheel but is not applying to the steering wheel the torque that is needed in order to avoid the obstacle.

Before describing the method that will be executed by the computer 13 in order to implement the invention itself, a first part of this explanation will describe the calculations that led to the invention, in order to allow a comprehensive understanding of where these calculations originated from and what they are based on.

The goal of this first part of the explanation is effectively to describe how it is possible to synthesize a controller which, once implemented in the computer 13, will enable the vehicle to be controlled in such a way that it follows the avoidance trajectory T0 in a way that is stable and performs well.

It will be considered here that the dynamic behavior of the vehicle can be modeled by means of the following Equation 1

$$\begin{pmatrix} \dot{V}_y \\ \dot{r} \\ \dot{\psi}_L \\ \dot{y}_L \end{pmatrix} = \begin{bmatrix} -\dfrac{C_f + C_r}{mV} & -V + \dfrac{C_r l_r + C_f l_f}{mV} & 0 & 0 \\ -\dfrac{C_f l_f + C_r l_r}{jV} & -\dfrac{C_r l_r^2 + C_f l_f^2}{jV} & 0 & 0 \\ 0 & 1 & 0 & 0 \\ 1 & l_s & V & 0 \end{bmatrix}$$ [Equation 1]

-continued $$\begin{pmatrix} V_y \\ r \\ \psi_L \\ y_L \end{pmatrix} + \begin{bmatrix} \dfrac{C_f}{m} \\ \dfrac{C_f l_f}{j} \\ 0 \\ 0 \end{bmatrix} \delta + \begin{bmatrix} 0 \\ \dfrac{1}{j} \\ 0 \\ 0 \end{bmatrix} M_z + \begin{bmatrix} 0 \\ 0 \\ -V \\ 0 \end{bmatrix} \gamma_{ref}$$

This model is a classic bicycle model.

It will be noted from this equation that the term $\gamma_{ref}$ for the curvature of the avoidance trajectory T0 makes it possible to take account of the trajectory of the vehicle (and therefore of the curvature of the road) in modeling the dynamic behavior of the vehicle.

It will also be noted from this equation that, in the preliminary state vector used, the first state variable will be the lateral velocity $V_y$. As an alternative, it would have been possible to use the slip angle $\beta$. However, the use of the lateral velocity $V_y$ will be preferable because it will make it possible to reduce the number of varying (scheduling) parameters in the nonlinear model described hereinafter.

The steering of the front wheels 11 can be modeled simply, using the following formula:

$$\begin{pmatrix} \ddot{\delta} \\ \dot{\delta} \end{pmatrix} = \begin{bmatrix} -2\xi w & -w^2 \\ 1 & 0 \end{bmatrix} \begin{pmatrix} \dot{\delta} \\ \delta \end{pmatrix} + \begin{pmatrix} w^2 \\ 0 \end{pmatrix} \delta_{ref}$$ [Equation 2]

The differential braking, for its part, exhibits a dynamic behavior that can be modeled using the following differential equation:

$$\dot{M}_z = -\tau M_z + \tau M_{z\_ref}$$ [Equation 3]

In this equation, $\tau$ is a dynamic characteristic of the yaw moment.

These three equations make it possible to express a new model for the behavior of the vehicle.

[Equation 4]

$$\begin{pmatrix} \dot{V}_y \\ \dot{r} \\ \dot{\psi}_L \\ \dot{y}_L \\ \ddot{\delta} \\ \dot{\delta} \\ \dot{M}_z \end{pmatrix} = \begin{bmatrix} -\dfrac{C_f + C_r}{mV} & -V + \dfrac{C_r l_r - C_f l_f}{mV} & 0 & 0 & 0 & \dfrac{C_f}{m} & 0 \\ -\dfrac{C_f l_f - C_r l_r}{jV} & -\dfrac{C_r l_r^2 - C_f l_f^2}{jV} & 0 & 0 & 0 & \dfrac{C_f l_f}{j} & \dfrac{1}{j} \\ 0 & 1 & 0 & 0 & 0 & 0 & 0 \\ 1 & l_s & V & 0 & 0 & 0 & 0 \\ 0 & 0 & 0 & 0 & -2\xi w & -w^2 & 0 \\ 0 & 0 & 0 & 0 & 1 & 0 & 0 \\ 0 & 0 & 0 & 0 & 0 & 0 & -\tau \end{bmatrix}$$

$$\begin{pmatrix} V_y \\ r \\ \psi_L \\ y_L \\ \delta \\ \delta \\ M_z \end{pmatrix} + \begin{bmatrix} \dfrac{C_f}{m} \\ \dfrac{C_f l_f}{j} \\ 0 \\ 0 \\ 0 \\ 0 \\ 0 \end{bmatrix} + \begin{bmatrix} 0 \\ 0 \\ 0 \\ 0 \\ \omega^2 \\ 0 \\ 0 \end{bmatrix} \delta_{ref} + \begin{bmatrix} 0 \\ 0 \\ 0 \\ 0 \\ 0 \\ 0 \\ \tau \end{bmatrix} M_{z\_ref} + \begin{bmatrix} 0 \\ 0 \\ -V \\ 0 \\ 0 \\ 0 \\ 0 \end{bmatrix} \gamma_{ref}$$

The variation in curvature of the avoidance trajectory T0 can also be modeled using the equation below.

$$\dot{\gamma}_{ref} = -\omega_{ref}\gamma_{ref} + \omega_f w \qquad \text{[Equation 5]}$$

In this equation, the variable or represents a dynamic characteristic of the variation in curvature of the trajectory, whereas the term w refers to a random input assumed to be bounded.

This equation (like Equation 3) makes it possible to model the variation in curvature of the trajectory in the form of a lowpass filter.

The previous two equations therefore make it possible to express an enriched model of the vehicle:

$$
\begin{pmatrix} \dot{V}_y \\ \dot{r} \\ \dot{\psi}_L \\ \dot{y}_L \\ \dot{\delta} \\ \dot{\delta} \\ \dot{M}_z \\ \dot{\gamma}_{ref} \end{pmatrix} =
\qquad \text{[Equation 6]}
$$

$$
\begin{bmatrix}
-\dfrac{C_f + C_r}{mV} & -V + \dfrac{C_r l_r - C_f l_f}{mV} & 0 & 0 & 0 & \dfrac{C_f}{m} & 0 & 0 \\
-\dfrac{C_f l_f - C_r l_r}{jV} & -\dfrac{C_r l_r^2 - C_f l_f^2}{jV} & 0 & 0 & 0 & \dfrac{C_f l_f}{j} & \dfrac{1}{j} & 0 \\
0 & 1 & 0 & 0 & 0 & 0 & 0 & -V \\
1 & l_s & V & 0 & 0 & 0 & 0 & 0 \\
0 & 0 & 0 & 0 & -2\xi w & -w^2 & 0 & 0 \\
0 & 0 & 0 & 0 & 1 & 0 & 0 & 0 \\
0 & 0 & 0 & 0 & 0 & 0 & -\tau & 0 \\
0 & 0 & 0 & 0 & 0 & 0 & 0 & -\omega_f
\end{bmatrix}
\begin{pmatrix} V_y \\ r \\ \psi_L \\ y_L \\ \delta \\ \delta \\ M_z \\ \gamma_{ref} \end{pmatrix}
+
\begin{bmatrix} 0 \\ 0 \\ 0 \\ 0 \\ \omega^2 \\ 0 \\ 0 \\ 0 \end{bmatrix} \gamma_{ref}
+
\begin{bmatrix} 0 \\ 0 \\ 0 \\ 0 \\ 0 \\ 0 \\ \tau \\ 0 \end{bmatrix} M_{z\_ref}
+
\begin{bmatrix} 0 \\ 0 \\ 0 \\ 0 \\ 0 \\ 0 \\ 0 \\ \omega_f \end{bmatrix} w
$$

In this new model, it may be noted that the speed V of the vehicle is involved. The speed in fact proves to be an important parameter to take into consideration in that the differential braking system will have an influence not only on the trajectory of the vehicle but also on the speed thereof. The vehicle speed will also be dependent on other factors such as the braking or acceleration setpoint imposed on the vehicle by the driver or by the computer 13.

In order to synthesize a trajectory-following controller (which will be described in greater detail hereinafter) which is robust in terms of stability and performance, it is therefore important to take the change in speed of the vehicle into account.

Here, the idea is therefore to reformulate the aforementioned Equation 6 as an LPV (Linear Parameter-Varying) model, which will then make it simpler to find a controller that will need to be optimized for this LPV model.

This improved model is as follows.

$$\dot{x}_p = \left(A_{p0} + A_{p1}\rho_{1/v} + A_{p2}\rho_v\right)x_p + B_p u_p + B_w w \qquad \text{[Equation 7]}$$

In this equation, the term $\rho_{1/v}$ is equal to the inverse of the speed V (namely 1/V), and the term $\rho_v$ is equal to the speed V. These two terms are commonly referred to as "varying parameters" or "scheduling parameters". Their vector $\rho$ is then written in the form $(\rho_{1/v}, \rho_v)$.

The state vector $x_p$ is defined as follows.

$$x_p = \begin{pmatrix} V_y & r & \psi_L & y_L & \delta & \delta & M_z & \gamma_{ref} \end{pmatrix}^T \qquad \text{[Equation 8]}$$

As for the vector $u_p$, this can be written:

$$u_p = \left(\delta_{ref} M_{z_{ref}}\right) \qquad \text{[Equation 9]}$$

The matrices used can themselves be expressed as follows:

$$
A_{p0} =
\begin{bmatrix}
0 & 0 & 0 & 0 & 0 & \dfrac{C_f}{m} & 0 & 0 \\
0 & 0 & 0 & 0 & 0 & \dfrac{C_f l_f}{j} & \dfrac{1}{j} & 0 \\
0 & 1 & 0 & 0 & 0 & 0 & 0 & 0 \\
1 & l_s & 0 & 0 & 0 & 0 & 0 & 0 \\
0 & 0 & 0 & 0 & -2\xi w & -\omega^2 & 0 & 0 \\
0 & 0 & 0 & 0 & 1 & 0 & 0 & 0 \\
0 & 0 & 0 & 0 & 0 & 0 & -\tau & 0 \\
0 & 0 & 0 & 0 & 0 & 0 & 0 & -\omega_f
\end{bmatrix}
\qquad \text{[Equation 10]}
$$

$$
A_{p1} =
\begin{bmatrix}
-\dfrac{C_f - C_r}{m} & \dfrac{C_r l_r - C_F l_F}{m} & 0 & 0 & 0 & 0 & 0 & 0 \\
-\dfrac{C_f l_f - C_r l_r}{j} & -\dfrac{C_r l_r^2 + C_f l_f^2}{j} & 0 & 0 & 0 & 0 & 0 & 0 \\
0 & 0 & 0 & 0 & 0 & 0 & 0 & 0 \\
0 & 0 & 0 & 0 & 0 & 0 & 0 & 0 \\
0 & 0 & 0 & 0 & 1 & 0 & 0 & 0 \\
0 & 0 & 0 & 0 & 0 & 0 & 0 & 0 \\
0 & 0 & 0 & 0 & 0 & 0 & 0 & 0
\end{bmatrix}
\qquad \text{[Equation 11]}
$$

$$
A_{p2} =
\begin{bmatrix}
0 & -1 & 0 & 0 & 0 & 0 & 0 & 0 \\
0 & 0 & 0 & 0 & 0 & 0 & 0 & 0 \\
0 & 0 & 0 & 0 & 0 & 0 & 0 & -1 \\
0 & 0 & 1 & 0 & 0 & 0 & 0 & 0 \\
0 & 0 & 0 & 0 & 0 & 0 & 0 & 0 \\
0 & 0 & 0 & 0 & 0 & 0 & 0 & 0 \\
0 & 0 & 0 & 0 & 0 & 0 & 0 & 0
\end{bmatrix}
\qquad \text{[Equation 12]}
$$

$$
B_p =
\begin{bmatrix}
0 & 0 \\
0 & 0 \\
0 & 0 \\
0 & 0 \\
\omega^2 & 0 \\
0 & 0 \\
0 & \tau \\
0 & 0
\end{bmatrix}
\qquad \text{[Equation 13]}
$$

$$
B_w =
\begin{bmatrix}
0 \\
0 \\
0 \\
0 \\
0 \\
0 \\
0 \\
\omega_f
\end{bmatrix}
\qquad \text{[Equation 14]}
$$

It will be noted that these equations are well defined and explained in the document by M. Corno, G. Panzani, F. Roselli, M. Giorelli, D. Azzolini and S. M. Savaresi entitled "An LPV Approach to Autonomous Vehicle Path Tracking in the e Presence of Steering Actuation Nonlinearities" in IEEE Transactions on Control Systems Technology, doi: 10.1109/TCST.2020.3006123.

At this stage, Equation 7 can be rewritten using a very specific form, namely in the form of a polytopic LPV system. To do this, it is assumed that the vehicle speed is confined between two boundaries, a minimum limit $V_{min}$ and a maximum limit $V_{max}$.

Figure 4:
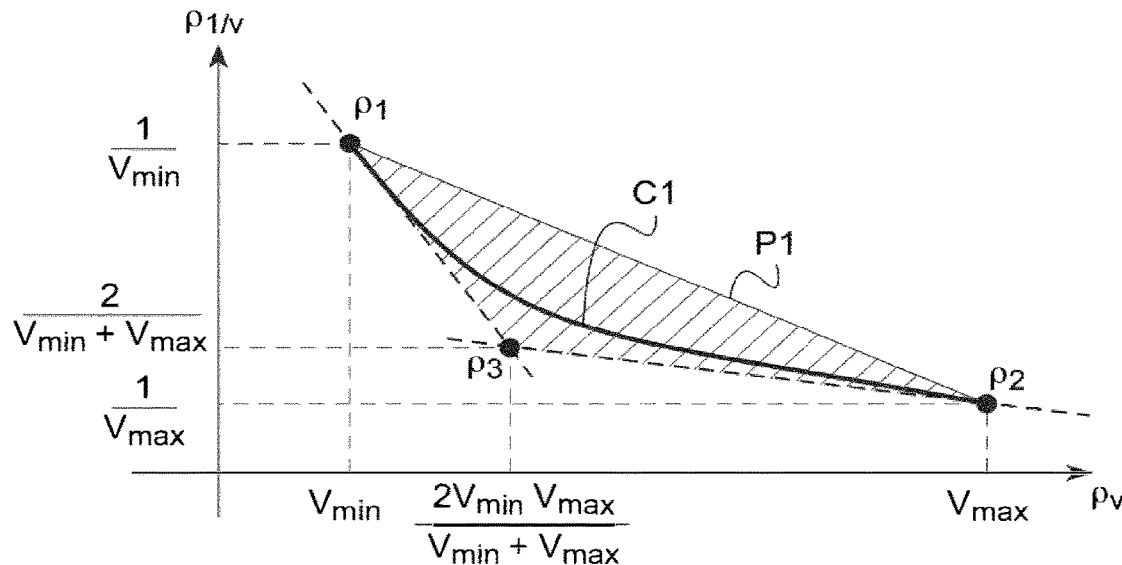
FIG. 4 is a diagram illustrating a polytope used in the context of the method of FIG. 1.

The varying parameters vector $\rho$ is then bounded by the outline of the geometric figure depicted in FIG. 4, referred to as polytope P1. This polytope here takes the form of a triangle. The vertices $\rho 1$, $\rho 2$ and $\rho 3$ of this polytope P1 are defined by the following equations.

$$\begin{cases} \rho_1 = \left(V_{min}, \dfrac{1}{V_{min}}\right) \\ \rho_2 = \left(V_{max}, \dfrac{1}{V_{max}}\right) \\ \rho_3 = \left(\dfrac{2V_{min}V_{max}}{V_{min}+V_{max}}, \dfrac{2}{V_{min}+V_{max}}\right) \end{cases} \quad \text{[Equation 15]}$$

As will become clearly apparent in the remainder of this explanation, the concept of this polytope is to take account of the fact that the controller K (which enables calculation of the setpoints to be transmitted to the actuators) will be dependent on the speed, and that it will be easier to calculate this by means of an approximation resulting from the theory of the projection onto a closed convex space.

Now, the function p illustrated in FIG. 4 is a curve C1 which varies between the extremities $\rho_1$ and $\rho_3$. The convex space chosen to enclose this curve C1 as tightly as possible is then the polytope P1. Specifically, the objective is to enclose the curve tightly so as not to increase the number of eventualities taken into consideration as so doing would render the controller too conservative. The triangular shape is the shape that yields the best results.

The theory chosen therefore makes it possible to calculate the controller K for any speed V comprised between two boundaries: a minimum limit $V_{min}$ and a maximum limit $V_{max}$, as a function of the three values of this controller K at the vertices $\rho_1$, $\rho_2$ and $\rho_3$ of this polytope P1. All that is then needed is simply to determine these three values of this controller K.

In practice, it is possible to rewrite Equation 7 thus:

$$\dot{x}_p = A_p(\rho)x_p + B_p u_p + B_w w \quad \text{[Equation 16]}$$

where $$A_p(\rho) = A_p^{p1} a_1 + A_p^{p2} a_2 + A_p^{p3} a_3 \quad \text{[Equation 17]}$$

in which $$A_p^{p1} = A_{p0} + A_{p1}\dfrac{1}{V_{min}} + A_{p2}V_{min} \quad \text{[Equation 18]}$$

-continued $$A_p^{p2} = A_{p0} + A_{p1}\dfrac{1}{V_{max}} + A_{p2}V_{max} \quad \text{[Equation 19]}$$

$$A_p^{p3} = A_{p0} + A_{p1}\dfrac{2}{V_{min}+V_{max}} + A_{p2}\dfrac{2V_{min}V_{max}}{V_{min}+V_{max}} \quad \text{[Equation 20]}$$

$$\alpha_1 = \dfrac{V_{min}(V - V_{max})^2}{V(V_{max}-V_{min})^2} \quad \text{[Equation 21]}$$

$$\alpha_2 = \dfrac{V_{max}(V - V_{min})^2}{V(V_{max}-V_{min})^2} \quad \text{[Equation 22]}$$

$$\alpha_3 = \dfrac{(V_{max}+V_{min})(V_{max} - V)(V - V_{min})}{V(V_{max}-V_{min})^2} \quad \text{[Equation 23]}$$

However, this model does not in itself make it possible to limit the steering angle and the steering rate of the front wheels 11 of the vehicle, or the amplitude of the yaw moment applied by the differential braking and the rate at which this yaw moment varies. Yet such limitations prove to be particularly important, notably for ensuring that the driver of the vehicle will be able to take back control of the vehicle at any moment.

Such limitations may be expressed using the following equations.

To limit the steering rate, it is possible to express $$|\dot{\delta}_{ref}| \le \upsilon_\delta \quad \text{[Equation 24]}$$

To limit the steering angle amplitude, it is possible to express $$|\delta_{ref}| \le \eta_\delta \quad \text{[Equation 25]}$$

In Equation 24, the coefficient $\upsilon_\delta$ is a constant that represents the steering rate not to be exceeded. This constant is defined either by calculation, or after a campaign of testing carried out on a test vehicle. It is, for example, equal to 0.0491 rad/s, which corresponds to 0.785 rad/s at the steering wheel (namely 45°/s) if the steering is geared at a ratio of 16.

In Equation 25, the coefficient $\eta_\delta$ is a constant that represents the steering angle not to be exceeded. This constant is defined either by calculation, or after a campaign of testing carried out on a test vehicle. It is, for example, equal to 0.0328 rad, which corresponds in this example to 0.524 rad at the steering wheel (namely) 30°.

The constraint expressed in Equation 25 makes it possible to limit the torque exerted by the power steering actuator such that an average driver can manually counteract this torque.

Specifically, the greater the steering angle, the greater the force applied by the power steering actuator. This limitation thus ensures that the user will be able to take back control of the vehicle without having to apply an excessive counter-torque. This angle will then be dependent on the force applied by the type of actuator chosen.

The constraint expressed in Equation 24 ensures that the driver is not taken by surprise by an excessively rapid variation in the orientation of the steering wheel.

It will be noted that the aforementioned values are given by way of example and could, alternatively, be lower (for example 25°/s and 20° in order to ensure greater comfort).

To limit the rate of variation of yaw moment, it is possible to express $$|\dot{M}_{z\_ref}| \leq \upsilon_m \qquad \text{[Equation 26]}$$

To limit the amplitude of yaw moment, it is possible to express $$|M_{z\_ref}| \leq \eta_M \qquad \text{[Equation 27]}$$

In Equation 26, the coefficient $\upsilon_M$ is a constant that represents the variation in yaw moment not to be exceeded. This constant is defined either by calculation, or after a campaign of testing carried out on a test vehicle. It is, for example, equal to 2500 Nm/s.

In Equation 27, the coefficient $\eta_M$ is a constant that represents the yaw moment not to be exceeded. This constant is defined either by calculation, or after a campaign of testing carried out on a test vehicle. It is, for example, equal to 2000 Nm.

These two equations allow the driver to take back control of the steering of the vehicle in a controllable manner, at any moment. They notably make it possible to limit the element of surprise that would be caused by a sharp lateral acceleration.

According to the invention, it is desirable to limit these four parameters not by imposing a sudden threshold but rather by progressively saturating their values. Above all, it is desirable for these four parameters to be taken into consideration in the synthesis of the controller so that the controller behaves in a manner that is more stable and more pleasant for the passengers of the vehicle.

Figure 5:
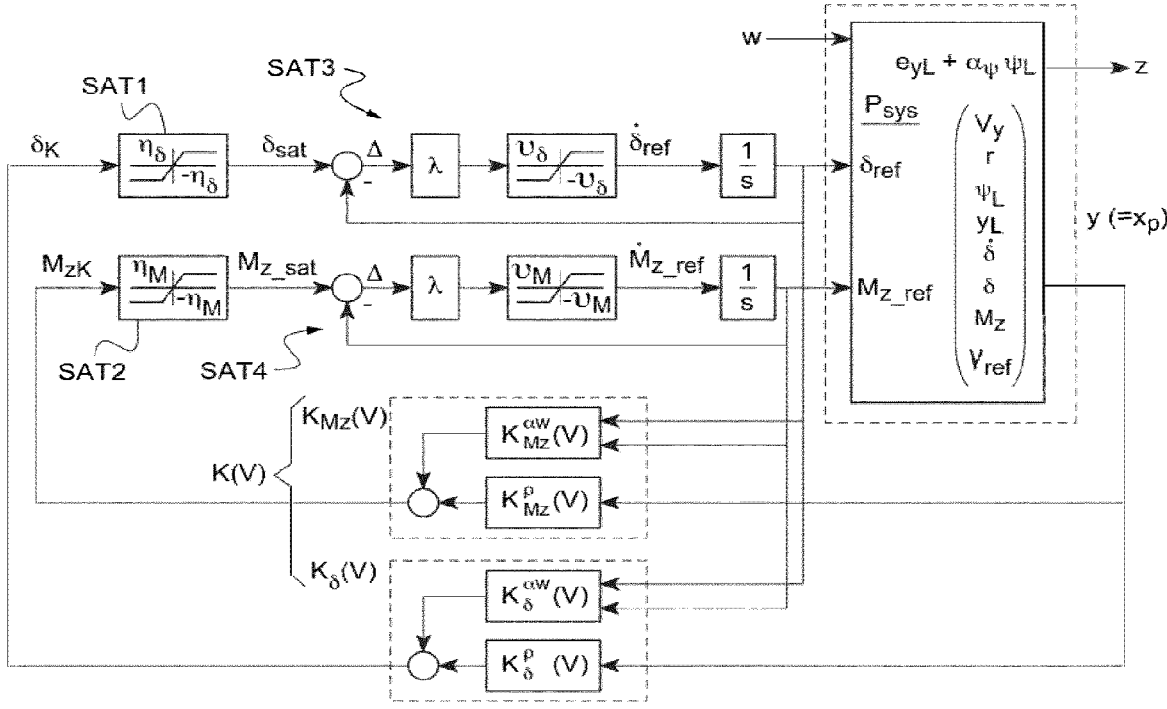
FIG. 5 is a diagram illustrating the closed-loop transfer function used for controlling the motor vehicle of FIG. 1.

FIG. 5 depicts the control architecture used to control the power steering actuator and the differential braking actuator so that the vehicle follows the avoidance trajectory T0 as closely as possible while conforming to the aforementioned constraints.

This figure indicates a controller K as being dependent on the vehicle speed V and as being made up of two components, one of them (denoted $K_{Mz}$) associated with the differential braking and the other (denoted $K_\delta$) associated with the power steering.

These two components respectively make it possible to calculate an unsaturated setpoint for the yaw moment $M_{zK}$ and an unsaturated setpoint for the steering angle $\delta_K$.

Each of these two components advantageously comprises a summer which at output supplies the unsaturated setpoint and at input receives a state return term (originating from a state return unit $K_{Mz}{}^P$, $K_\delta{}^P$) which is dependent on the state of the vehicle, and a saturation compensation term (originating from a saturation compensation unit $K_{Mz}{}^{aw}$, $K_\delta{}^{aw}$) which is dependent on the saturated yaw moment setpoint $M_{z\_ref}$ or saturated steering angle setpoint $\delta_{ref}$ which was calculated in the preceding iteration.

The saturation compensation term reinforces the stability of the controller in a non-linear mode, namely in instances in which the power steering actuator or yaw moment actuator command is saturated in terms of amplitude or in terms of rate.

The unit SAT1 indicated in FIG. 5 illustrates the amplitude saturation of the unsaturated steering angle setpoint $\delta_K$. As input it receives the output from the corresponding component of the controller K and as output it supplies a semi-saturated steering angle setpoint $\delta_{sat}$. It may be observed that this unit operates in open-loop.

The unit SAT2 illustrates the amplitude saturation of the unsaturated yaw moment setpoint $M_{zK}$. As input it receives the output from the corresponding component of the controller K and as output it supplies a semi-saturated yaw moment setpoint $M_{z\_sat}$. It may be observed that this unit also operates in open-loop.

The set of units SAT3 illustrates the rate saturation of the semi-saturated steering angle setpoint $\delta_{sat}$. As input it receives this semi-saturated setpoint and as output it supplies the saturated steering angle setpoint $\delta_{ref}$. It may be observed that this is a closed loop.

The set of units SAT4 illustrates the rate saturation of the semi-saturated yaw moment setpoint $M_{z\_sat}$. As input it receives this semi-saturated setpoint and as output it supplies the saturated yaw moment setpoint $M_{z\_ref}$. It may be observed that this is also a closed loop.

In each of these two sets of units SAT3, SAT4, corresponding to "pseudo rate limiter" functions, there is therefore provided, at input, a summer making it possible to calculate the difference A between the semi-saturated setpoint and the saturated setpoint in the preceding iteration. It comprises a multiplier unit able to multiply this offset by the parameter $\lambda$, a saturation unit ensuring that the derivative of the saturated setpoint is not exceeded, and an integration unit for obtaining the saturated setpoint (via a Laplace transform).

The parameter $\lambda$ represents the dynamic behavior of the units SAT3 and SAT4 (for this application it is possible to consider that $\lambda=500$), and the greater the value of $\lambda$, the more closely the behavior of this pseudo rate limiter to the behavior of a rate limiter.

In FIG. 5, the unit $P_{sys}$ represents the open-loop system that describes the dynamic behavior of the vehicle, the behavior of the power steering actuator, the behavior of the differential braking actuator and the positioning of the vehicle with respect to the avoidance trajectory T0.

It may be observed that this unit receives as input the disturbance w, the saturated yaw moment setpoint $M_{z\_ref}$, and the saturated steering angle setpoint $\delta_{ref}$. As output it delivers an output vector y and an error z.

The output vector y in practice corresponds to the state vector $x_p$ introduced earlier.

The error z for its part has a value that is to be minimized.

This error z here is a function of the trajectory-following error $e_{yL}$ and of the relative heading angle between the longitudinal axis A1 of the vehicle and the tangent to the avoidance trajectory T0 (hereinafter referred to as heading error $\psi_L$), which it is known need to be minimized.

It is therefore possible to write:

$$z = e_{yL} + \alpha_\psi \psi_L \qquad \text{[Equation 28]}$$

In this equation, the term $\alpha_\psi$ is an adjusting coefficient for adjusting the error that is to be minimized as a priority (the heading-following (or heading-angle) error or position-following error). It will be seen later on in this explanation how the value of this adjusting coefficient is chosen. This choice of output error z makes it possible to ensure both correct position following and correct heading following.

The objective is therefore to determine the form of the controller K which is a state return regulator able to calculate the unsaturated yaw moment setpoint $M_{zK}$ and the unsaturated steering angle setpoint $\delta_K$ on the basis of the preliminary state vector $x_p$, taking the vehicle speed V into account.

In order to understand how to determine a controller K which is suitable both in terms of stability and in terms of performance, it is first of all possible to describe the system $P_{sys}$ when it is operating in open-loop, namely in linear mode, without saturation (the scenario in which the saturated and unsaturated steering angle setpoints $\delta_{ref}$, $\delta_K$ are equal and in which the saturated and unsaturated yaw moment setpoints $M_{z\_ref}$, $M_{zK}$ are also equal).

The system here can be expressed in a generic form:

$$\dot{x}_p = A_p(\rho), x_p + B_p, u_p + B_w w \qquad \text{[Equation 29]}$$

$$z = C_{pz}, x_p$$

$$y = x_p$$

Given the content of Equation 28, the matrix $C_{pz}$ is known. It will be noted that the matrices of principals $A_p$; commands $B_p$ and disturbances $B_w$ can be deduced from Equation 6.

The controller K, for which we are seeking the optimal gains that meet our control criteria, and which is defined as a static state return regulator, may itself be expressed in the form:

$$u_k = K(\rho), x \qquad \text{[Equation 30]}$$

In this equation, the term x is the state vector augmented by the saturated steering angle setpoint and saturated yaw moment setpoint. It will be this augmented state vector that will be considered in the remainder of this explanation. It may be expressed as follows.

$$x = [x_p \ u_p]^T \qquad \text{[Equation 31]}$$

For the reasons mentioned above with reference to FIG. 5, the state return gain that is to be optimized forms a 2×2 matrix the terms of which are dependent on the vehicle speed V and which can be expressed as:

$$K(\rho) = \begin{bmatrix} K_\delta^p(\rho) & K_\delta^{aw}(\rho) \\ K_{Mz}^p(\rho) & K_{Mz}^{aw}(\rho) \end{bmatrix} \qquad \text{[Equation 32]}$$

As has been explained above, the controller K can be expressed as a function of its values at the vertices $\rho_1$, $\rho_2$ and $\rho_3$ of the polytope. It may be expressed more specifically in the following polytopic form:

$$K(\rho) = K^{\rho 1} a_1 + K^{\rho 2} a_2 + K^{\rho 3} a_3 \qquad \text{[Equation 33]}$$

In this equation, the terms $\alpha_1$, $\alpha_2$, $\alpha_3$ are as defined by Equations 21 to 23.

The matrices $K^{p1}$, $K^{p2}$, $K^{p3}$ on the basis of which the controller K can be calculated, must themselves be determined by an optimization approach proposed in the paragraphs to follow.

Here, the idea therefore is to synthesize not an infinite number of controllers K but a reduced number (three) of these. The values of the other controllers may then be interpolated as a function of those of these three matrices, via the aforementioned convex combination.

The system Psys may now be described for when it is operating in closed-loop, namely in nonlinear mode with saturation (a scenario in which the saturated and unsaturated setpoints are not equal).

Given the content of Equations 29 and 30, it is possible to write:

$$\dot{x} = (A(\rho) + BA_1 + BB_1 K(\rho)) x + BB_1 \psi_1(x) + B\psi_2(x) \qquad \text{[Equation 34]}$$

In this equation, the terms A, B, $A_1$ and $B_1$ are defined as follows:

$$A(\rho) = \begin{bmatrix} A_\rho(\rho) & B_p \\ 0 & 0 \end{bmatrix} \qquad \text{[Equation 35]}$$

$$B = \begin{bmatrix} 0 \\ 1 \end{bmatrix} \qquad \text{[Equation 36]}$$

I is the identity matrix.

$$A_1 = [\, 0 \ \ -\Lambda\, ] \qquad \text{[Equation 37]}$$

$$B_1 = \Lambda \qquad \text{[Equation 38]}$$

$$\Lambda = \begin{bmatrix} \lambda & 0 \\ 0 & \lambda \end{bmatrix} \qquad \text{[Equation 39]}$$

In order to take account of the controllability constraints as defined in Equations 24 to 27, two new saturation functions $\psi_1(x)$ and $\psi_2(x)$ have been introduced, these representing the crossing of the limits by the unsaturated command input.

The two saturation functions $\psi_1(x)$ and $\psi_2(x)$ may therefore be defined:

$$\psi_1(x) = sat_\eta(K(\rho), x) - K(\rho), x \qquad \text{[Equation 40]}$$

$$\text{[Equation 41]}$$

$$\psi_2(x) = sat_v(A_1 x + B_1 sat_\eta(K(\rho), x)) - (A_1 x + B_1 sat_\eta(K(\rho), x))$$

In these two equations, use is made of a saturation function denoted $sat_{f0}(f)$, which can be defined:

$$\begin{cases} sat_{f0}(f) = f \ si\, |f| \le f_0 \\ sat_{f0}(f) = f_0 \ si\, |f| \ge f_0 \end{cases} \qquad \text{[Equation 42]}$$

It will therefore be noted that these two saturation functions $\psi_1(x)$ and $\psi_2(x)$ take the value zero in the unsaturated mode or if not take non-zero values.

The objective then is to model the saturation functions by modeling using nonlinear sectors ("dead-zone nonlinearities"), on the basis of work disclosed in the referenced documents:

by S. Tarbouriech, G. Garcia, J. M Gomes da Silva Jr and I. Queinnec entitled "Stability and Stabilization of Linear Systems with Saturating Actuators", 1$^{st}$ edition, London: Springer 2011, and by Alessandra Palmeira, João Manoel Gomes da Silva Jr, Sophie Tarboureich, and I. Ghiggi entitled "Sampled-data control under magnitude and rate saturating actuators", International Journal of Robust and Non-linear Control, Wiley, 2016, 26 (15), pp. 3232-3252.

In order to model the limits of controllability of the system, it is possible to define two polyhedra, of which one, denoted $S_1(x, \eta)$, models the amplitude saturation behavior and the other, denoted $S_2(x, \psi_1, v)$, models the speed saturation behavior. These two polyhedra may be modeled in the following form:

$$S_1(x, \eta) = \{x \in R^n, |(K(\rho) - G_1(\rho))x| \le \eta\} \qquad \text{[Equation 43]}$$

$$S_2(x, \psi_1, v) = \qquad \text{[Equation 44]}$$

$$\{x \in R^n, \psi_1 \in R^m, |(A_1 + B_1 K(\rho) - G_2(\rho))x + (B_1 - G_3(\rho))\psi_1(x)| \le v\}$$

This modeling involves matrices $G_1$, $G_2$ and $G_3$. These matrices are the same size as that of the controller K. They illustrate the offset permitted for exceeding saturation conditions.

By way of illustration, the matrix $G_1$ could be considered to be equal to the product of the matrix K and a scalar quantity $\alpha_K$. Equation 44 could then be rewritten in a form involving the term $(1-\alpha_K)$, which would then constitute a setting for permitted exceeding of a limit. The extent to which this limit can be exceeded may for example be set at 10%. In order to set this limiting extent, road trials would need to be conducted.

However, as a preference, this matrix $G_1$ will not be a function of the matrix K. It will need to be optimized not through road trials but by calculation, for example using the linear matrix inequality method. In that way the conservatism of a solution as described in the preceding paragraph will be avoided.

In a first step, it may be assumed that while the system is operating in closed-loop (as defined in Equation 7), the state vectors x and the variable $\psi_1$ lie within these two polyhedra, such that it is possible to write:

$$\begin{cases} x \in S_1(x, \eta) \\ (x, \psi_1) \in S_2(x, \psi_1, v) \end{cases} \qquad \text{[Equation 45]}$$

Figure 6:
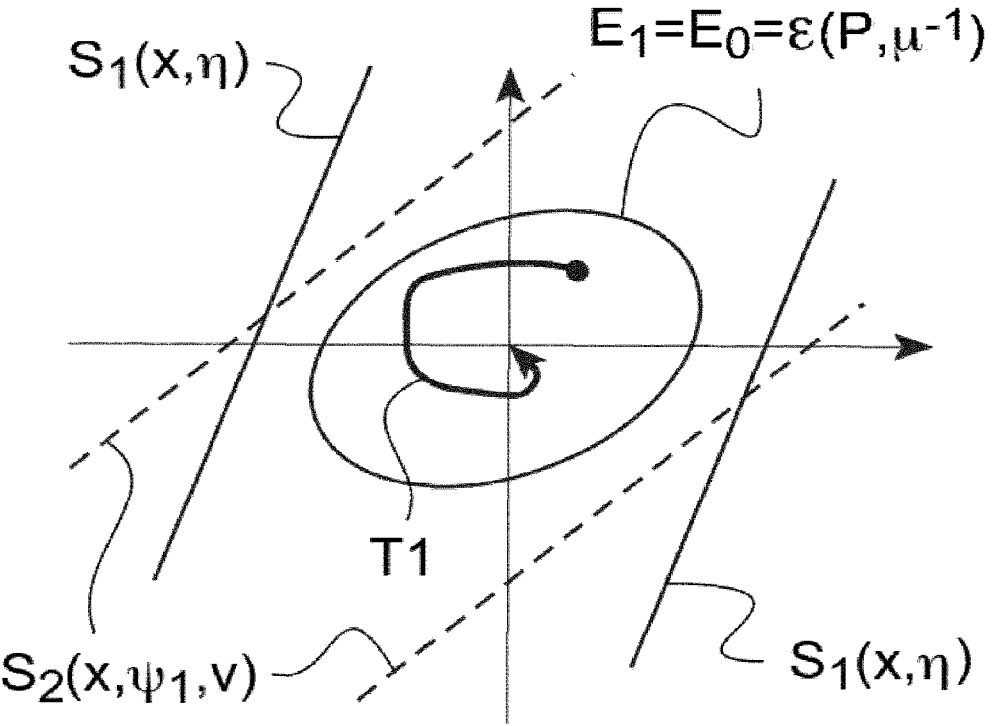
FIG. 6 is a graph illustrating saturation polyhedra and a basin of attraction of the controller used in the context of the method of FIG. 1, and an example of how the vehicle state varies in the absence of a disturbance.
Figure 7:
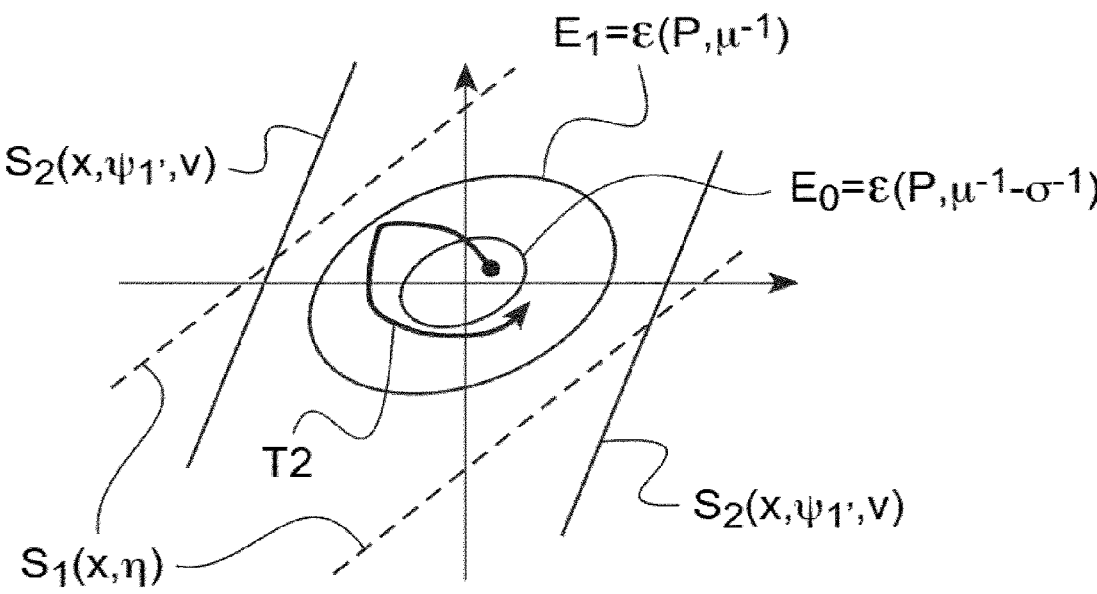
FIG. 7 is a graph similar to that of FIG. 4; but representing an example in which the vehicle state varies in the presence of a disturbance.

These two polyhedra are represented here in FIGS. 6 and 7 and therefore, as clearly described above, represent two spaces within which system stability and performance are guaranteed.

It will be noted at this stage that these figures illustrate two-dimensional graphs simplifying the solution described hereinabove with a view to making it more readily understood.

In other words, this two-dimensional representation is valid only if the state vector x contains only two state variables, one forming the abscissa values and the other the ordinate value of each of these graphs.

In practice here, the state vector comprises ten state variables. A representation of the invention would therefore need to be plotted in ten dimensions.

With the hypothesis postulated in the above equation, the following inequalities are satisfied for all the positive diagonal matrices $U_1$ and $U_2$, which more specifically here are positive scalar quantities:

$$\psi_1^T U_1(\psi_1 + G_1(\rho), x) \le 0 \qquad \text{[Equation 46]}$$

$$\psi_2^T U_2(\psi_2 + G_2, x + G_3(\rho), \psi_1) \le 0$$

It will be noted here that these scalar quantities $U_1$ and $U_2$ are introduced here simply to facilitate subsequent calculations (using the S-procedure).

In summary, Equations 43 and 44 are two saturation models, for amplitude saturation and speed saturation respectively, which, although still valid within the meaning of Equation 45, ensure that Equation 46 is likewise valid.

These models can then be used to synthesize (which is to say optimize) the principal gains $K_\delta^P$, $K_{Mz}^P$ of the state return which are linked to the state variables of the system P operating in open-loop, and the saturation compensation gains ("anti-windup" gains) $K_\delta^{aw}$, $K_{Mz}^{aw}$ of the controller K.

Equation 34 in closed-loop operation and the representation of the system Psys as shown in FIG. 5 make it possible to write:

$$\text{[Equation 47]}$$

$$\dot{x} = (A(\rho) + BA_1 + BB_1 K(\rho))x + BB_1 \psi_1(x) + B\psi_2(x) + B_w w$$

$$z = C_z x$$

It is assumed that the disturbance w is limited in terms of energy, which is to say bounded by limits, such that it is possible to write:

$$\|w\|_2^2 = \int_0^\infty w^2(t)\, dt \le \sigma^{-1} \qquad \text{[Equation 48]}$$

This hypothesis is linked to the fact that the curvature of the trajectory (which here is considered to be a disturbance) and the duration for which the AES function is activated are always bounded by limits.

Therefore, in Equation 48, in which the term w is connected curvature of the avoidance trajectory, the maximum value $w_{max}$ Of this term is known (because the dynamic limits of the vehicle and therefore the maximum curvature that the vehicle is able to follow in complete safety and which can therefore be imposed by the trajectory planning is known).

In order to obtain an optimal solution for the controller K, a Lyapunov function V(t) for the conditions of stability is first of all defined:

$$v(t) = x^T P x \qquad \text{[Equation 49]}$$

In this equation, the matrix P is defined as being positive and symmetrical.

The benefit of this Lyapunov function V(t) is that if its first derivative is strictly negative, it ensures that the system will always be stable where no disturbance is present.

FIGS. 6 and 7 depict the two polyhedra that ensure system performance and stability. A space that is situated in both of these two polyhedra simultaneously will therefore be sought. This may for example be the intersection of these two spaces.

However, here, it will be preferable to model this space in the form of an ellipse referred to as a basin of attraction. This basin of attraction ε is defined here in the form:

$$\varepsilon(P, \mu) = x \in R^n, x^T P x \leq \mu^{-1} \qquad \text{[Equation 50]}$$

In addition to the stability condition relating to this Lyapunov function V(t), this basin of attraction needs to be included in the two polyhedra S1 and S2 which respectively model the amplitude and rate saturations, so as to ensure system stability (which remains the priority to be guaranteed).

The basin of attraction ε is therefore a space of stability (or space of invariability) of the system concerned. In other words, this is a space within which the trajectories of the state variables (which is to say the components of the state vector x) remain, provided they have been initialized, within this space (even if the system is subjected to disturbances and saturations of the actuators).

Bearing in mind the content of the aforementioned equations, the spaces in which the system state variables are able to move have been depicted schematically in FIGS. 6 and 7.

As will be appreciated from the figures, the controller K is then synthesized in such a way as to meet three objectives.

The first objective is that, in the absence of disturbance, the controller K should guarantee that the trajectories of the state variables of the system operating in closed-loop remain within the basin of attraction ε (which ensures stability) and converge asymptotically toward the origin (which ensures performance), notably within a predefined length of time.

FIG. 6 considers the case of absence of disturbance. In this case, the space for the initial conditions of the system, which are denoted $E_D$, and the estimate $E_1$ of the basin of attraction ε are coincident. Here it may be seen that the trajectory T1 of the state vector x starting from any initial situation does indeed converge toward the origin.

The second objective is that, in the presence of a disturbance, the controller K should guarantee that the trajectories of the state variables of the system operating in closed-loop remain within the basin of attraction ε (which ensures stability) irrespective of the disturbance w, provided that this disturbance is limited in terms of energy (within the meaning of Equation 48).

FIG. 6 considers the case of an absence of disturbance. In this case, the space for the initial conditions of the system, which are denoted $E_0$, have to be contained within the initial situation contained within the space $E_0$, does indeed remain within the basin of attraction ε.

The third objective is that, in linear mode (without amplitude or rate saturation), the controller K should guarantee the performance of the system, which then takes precedence over stability, by contriving for the synthesis of the norm H∞ to be smaller than a predetermined scalar quantity.

It will be recalled that this synthesis consists in finding the controller K that is such that the norm H∞ of the term $F_1(P_{sys}, K)$ is at a minimum, where:

$$z = F_1(P_{sys}, K), w \qquad \text{[Equation 51]}$$

This equation may be written in the form:

$$\dot{V}(t) + z^T z - \gamma^2 w^T w < 0 \qquad \text{[Equation 52]}$$

It will be noted here that γ is the norm H∞ of the transfer function of w→z. In linear mode (without saturation) there will be a guarantee on performance (with the norm H∞) as a result of this constraint.

This synthesis implies proper rejection of the disturbance w and proper following of the avoidance trajectory (with an error z that is close to zero).

In practice, in order to meet these three objectives, there are a number of methods that may be used.

The method used is preferably the use of Linear Matrix Inequalities (LMI). This is performed on the basis of convex optimization criteria with linear matrix inequality constraints (the linearity of the terms in the matrices used ensuring that the mathematical problem can be solved without entailing an excessive computation workload).

The objective more specifically is to optimize the gains of the closed loop defined by the controller K by altering the choice of poles.

Specifically, if there exist matrices with suitable dimensions R(ρ) Q, $L_1(\rho)$, $L_2(\rho)$, $T_1(\rho)$, $T_2(\rho)$, such that the optimization problem below is feasible, a controller K that meets the aforementioned three objectives is then obtained.

These matrices are calculated as a function of the matrix P.

The matrix inequations used here are three in number and are defined by the following inequations, in which γ is to be minimized.

[Equation 53]

$$\begin{bmatrix} QA(\rho)^T + QA_1^T B^T + R(\rho)^T B_1^T B^T + A(\rho)Q + BA_1 Q + BB_1 R(\rho) & QC_2^T & BB_1 T_1(\rho) - L_1(\rho) & BT_2(\rho) - L_2(\rho) & B_w \\ \ddagger & -\gamma I_2 & 0 & 0 & 0 \\ \ddagger & \ddagger & -2T_1(\rho) & -T_1(\rho)B_1^T & 0 \\ \ddagger & \ddagger & \ddagger & -2T_2(\rho) & 0 \\ \ddagger & \ddagger & \ddagger & \ddagger & -I_w \end{bmatrix} < 0$$

$$\begin{bmatrix} Q & R(\rho)_{(i)}^T - L_1(\rho)_{(i)} \\ * & \sigma\eta_{(i)}^2 \end{bmatrix} \geq 0 \qquad \text{[Equation 54]}$$

$$\begin{bmatrix} Q & QA_1^T + R(\rho)_{(i)}^T B_1^T - L_2(\rho)_{(i)} \\ * & \sigma v_{(i)}^2 \end{bmatrix} \geq 0 \qquad \text{[Equation 55]}$$

estimate $E_1$ of the basin of attraction ε. Here it may be seen that the trajectory T2 of the state variables, starting from any In these inequations, i is an integer equal to 1 and then to 2 successively.

The term $X_{(i)}$ corresponds to the $i^{th}$ row of the matrix X. Still in these inequations, a matrix in the form $$\begin{bmatrix} X & Y \\ Y^T & W \end{bmatrix}$$

is written in the form $$\begin{bmatrix} X & Y \\ * & W \end{bmatrix}$$

The matrix variables R, Q, $L_1$, $L_2$, $T_1$, $T_2$ are expressed here in the form of matrices of suitable dimensions.

The matrix variables are expressed in the following form:

$$\begin{cases} Q = P^{-1} \\ R(\rho) = K(\rho)P^{-1} \\ T_1(\rho) = U_1^{-1}(\rho) \\ T_2(\rho) = U_2^{-1}(\rho) \\ L_1(\rho) = QG_1^T(\rho) \\ L_2(\rho) = QG_2^T(\rho) \end{cases} \qquad \text{[Equation 56]}$$

In order to solve the optimization problem below in the context of the problem as stated, it is necessary to solve the matrix inequations (LMIs) only for each vertex ($\rho_1$, $\rho_2$, $\rho_3$) of the polytope depicted in FIG. 4, which amounts to solving 9 inequations.

At this stage, in order to optimize each of the terms $K^{\rho 1}$, $K^{\rho 2}$, $K^{\rho 3}$, the vehicle speed V is assumed to be constant (so that all of these matrices are therefore considered to be constant). Specifically, each term is optimized for a determined vector $\rho$, namely for a determined speed.

The three inequations in Equations 53 to 55 ensure that the dynamic range of the closed loop remains limited, namely that the system remains stable in the absence or in the presence of a disturbance (the first two conditions are therefore met).

The first inequation in Equation 53 also guarantees the performance (in the sense of the norm H∞) of the system operating in closed-loop when the system is subjected to a disturbance. This inequation thus ensures that the third condition is met.

Once the 9 matrix inequations have been solved, the local controllers at the vertices of the polytope P1 are calculated as follows:

$$K^{\rho 1} = R(\rho_1)Q^{-1} \qquad \text{[Equation 57]}$$

$$K^{\rho 2} = R(\rho_2)Q^{-1} \qquad \text{[Equation 58]}$$

$$K^{\rho 3} = R(\rho_3)Q^{-1} \qquad \text{[Equation 59]}$$

It is thus possible to obtain the controller K($\rho$) since it is the convex combination of these local controllers. More specifically, the controller is determined using Equations 33 and 21 to 23.

At this stage, it may be noted that, as a preference, the controller K to be used for defining the control setpoints for the actuators may be dependent not only on the vehicle speed V but also on the form of the avoidance trajectory T0.

In order to understand how, it must first of all be noted that, in Equation 48, in which the term w represents the curvature of the avoidance trajectory, the maximum value $w_{max}$ for this curvature is known (because the dynamic limits of the vehicle and therefore the maximum curvature that the vehicle can follow in complete safety and that can therefore be imposed by the trajectory planning are known). As a result, the parameter $\sigma$ can be defined as:

$$\sigma = \frac{1}{\int_0^{T_{AES}} w_{max}^2(t)dt} \qquad \text{[Equation 60]}$$

In this equation, the time $T_{AES}$ corresponds to the maximum duration of activation of the AES function, which is generally between 1 and 3 seconds, and notably corresponds to the duration of the avoidance maneuver.

When the avoidance trajectory T0 has been defined, it is therefore possible to calculate the value of this parameter $\sigma$.

The maximum interval for the curvatures of the avoidance trajectories T0 that the vehicle can achieve may be broken down into N uniform sub-intervals. The term $\sigma$ can therefore be considered as belonging to one particular interval, and this can be written:

$$\sigma \in [\sigma_i, \sigma_{i+1}] \qquad \text{[Equation 61]}$$

where i is a natural integer ranging from 1 to N.

Each interval may be defined by the value of its mean, which can be written:

$$\overline{\sigma_i} = [\sigma_i + \sigma_{i+1}]/2 \qquad \text{[Equation 62]}$$

The performance of the controller K is dependent on the curvature of the avoidance trajectory T0. Specifically, the lesser the curvature (namely the greater the radius of curvature at each point of the trajectory) the easier it is to follow the avoidance trajectory T0.

In the proposed concept of optimizing using linear matrix inequalities it is necessary to fix the term $\sigma$ (which is inversely proportional to the curvature) in order to find a controller.

In other words, the controller obtained is optimal only for one considered curvature. However, this controller will not be so robust if the vehicle has to follow trajectories of greater curvature, because that will lead to risks of instability. Conversely, it will not perform as well (there will be a delay in following or an overshoot) if the vehicle is made to follow trajectories of smaller curvature.

Now, upon the triggering of the AES function, an avoidance trajectory T0 suited to the situation is calculated for a fixed time outlook (the next 3 seconds).

As a preference, the controller K can then be synthesized in such a way as to suit the curvature of the avoidance trajectory T0.

More specifically, it will be possible to synthesize several controllers K($\rho$) using the aforementioned inequations, each controller being associated with one of the of aforementioned intervals (and more specifically with the mean $\overline{\sigma}_i$ thereof). These controllers can then be written in the form K($\rho$, $\overline{\sigma}_i$).

It will then be possible to choose the controller synthesized for the value of $\bar{\sigma}_i$ that is closest to the term $\sigma$ calculated for the avoidance trajectory T0.

Figure 8:
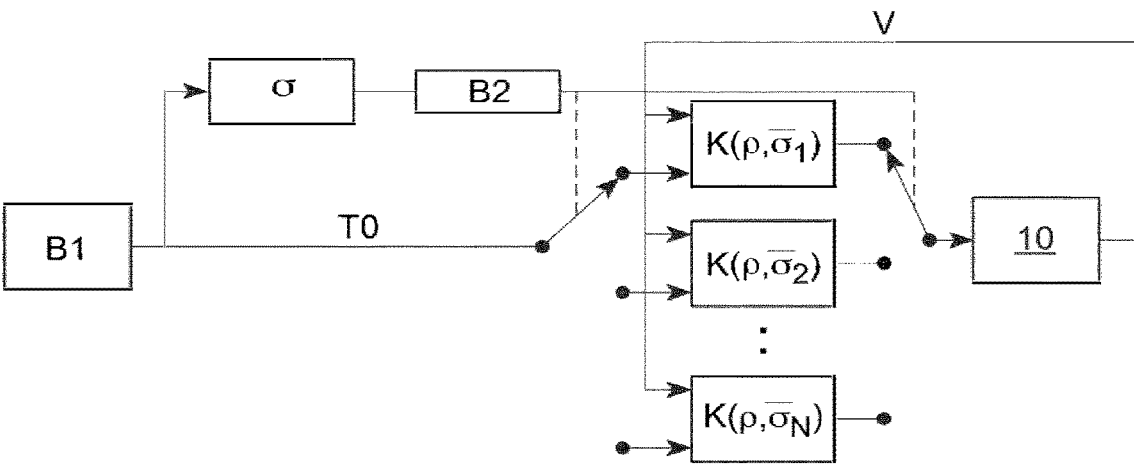
FIG. 8 is a diagram illustrating a method for selecting a suitable controller in the context of the method of FIG. 1.

In practice, as shown in FIG. 8, a calculation module B1 is able to determine the avoidance trajectory T0, making it possible to calculate the value for the parameter $\sigma$. Thereafter, a switch B2 will be able to select, for the entirety of the avoidance trajectory T0 to be created, a controller $K(\rho, \bar{\sigma}_i)$ that will be suitable for the curvature of the trajectory.

Thus, this controller will be dependent not only on the vehicle speed V but also on the curvature of the avoidance trajectory T0.

At this stage, it may also be briefly noted that there are several types of controller K that can be obtained, depending on the chosen value of $\alpha_\psi$. Specifically, it is possible to alter the performance of the controller K by adjusting the value of $\alpha_\psi$.

Thus, the adjustment coefficient $\alpha_\psi$, when low in value, makes it possible to obtain a controller K that minimizes the position-following error. By contrast, when its value is high, it makes it possible to obtain a controller K that minimizes the heading-following error. At the start of an avoidance, the adjustment coefficient $\alpha_\psi$ will be chosen to have a low value (lower than 20) to ensure that the vehicle correctly follows the avoidance trajectory T0. By contrast, at the end of the avoidance maneuver (once the obstacle has been passed), the adjustment coefficient $\alpha_\psi$ will be chosen to have a high value (higher than 20) to ensure that the vehicle is indeed repositioned parallel to the road.

Thus, by way of example, if the driver wishes to take back control at the start of the avoidance maneuver, and swerves further around the obstacle than intended (within the meaning of the avoidance trajectory T0), the high value of the adjustment coefficient $\alpha_\psi$ at the end of the avoidance maneuver means that the setpoints will not needlessly bring the vehicle back onto the avoidance trajectory when this trajectory has been overshot by a great deal (as this would otherwise be unsettling for the driver).

Now that the calculation hypotheses have been clearly established, the method that will be executed by the computer 13 of the motor vehicle in order to implement the invention may be described.

The computer 13 here is programmed to implement the method recursively, which is to say iteratively in a loop.

In order to do that, in a first step, the computer 13 verifies that the autonomous obstacle avoidance function (the AES) can be activated and that an obstacle avoidance trajectory has been planned by the unit B1. It then calculates the parameter $\sigma$ in order to choose a controller $K(\rho, \bar{\sigma}_i)$ suitable for the curvature of this trajectory.

At this stage, and as a preference, provision may be made that, if the parameter $\sigma$ exceeds a predetermined threshold, the computer holds the process and does not activate the AES function. Specifically, in such an eventuality, it is considered that the process will not be able to achieve obstacle avoidance in complete safety.

If not, the AES function is activated.

The computer 13 will then seek to define one control setpoint for the conventional steering system and another for the differential braking system, that enable this avoidance trajectory T0 to be followed as closely as possible.

In order to do that, it begins with calculating or measuring the following parameters:

the measured steering angle $\delta$, the estimated yaw moment $M_z$, the derivative of the measured steering angle $\delta$ with respect to time, the lateral velocity $V_y$, the yaw velocity r, the relative heading angle $\psi_L$, the sideslip $y_L$, the curvature $\gamma_{ref}$ of the avoidance trajectory, the saturated steering angle setpoint $\delta_{ref}$ obtained in the previous iteration, and the saturated yaw moment setpoint $M_{z\_ref}$ obtained in the previous iteration.

The computer 13 then acquires the equations of the matrices $K^{\rho 1}$, $K^{\rho 2}$, $K^{\rho 3}$, which are obtained from data stored in its memory and corresponding to the adjustment coefficient $\alpha_\psi$ chosen and to the curvature of the avoidance trajectory T0.

The controller K is then calculated as a function of the vehicle speed V, by determining the values of the coefficients $\alpha_1$, $\alpha_2$, $\alpha_3$ beforehand.

The controller K will then make it possible to determine the values for the unsaturated steering angle setpoint $\delta_K$ and saturated steering angle setpoint $\delta_{ref}$ and the values for the unsaturated yaw moment setpoint $M_{zK}$ and for the saturated yaw moment setpoint $M_{z\_ref}$.

It will be noted that the matrices $K^{\rho 1}$, $K^{\rho 2}$, $K^{\rho 3}$ of the controller K are synthesized taking account of the saturation functions such that the setpoints are perfectly suited to the saturation model chosen.

Finally, the saturated steering angle setpoint $\delta_{ref}$ will be transmitted to the power steering actuator in order to turn the wheels of the motor vehicle 10. Likewise, the saturated yaw moment setpoint $M_{z\_ref}$ will be transmitted to the actuator of the differential braking system in order to brake the wheels of the motor vehicle 10.

This method is then repeated in a loop throughout the avoidance trajectory T0.

The present invention is not in any way restricted to the embodiment described and illustrated, rather the person skilled in the art will know how to vary it in any way that is in accordance with the invention.

The method may thus be applied to other types of fields in which a particular trajectory is to be followed, for example in aeronautics or in robotics (notably when the robot is small and one of its commands needs to be saturated).

The invention claimed is:

1. A method for autonomous control of at least one actuator of an automotive device which is configured to influence a trajectory of said automotive device to avoid an obstacle in a path of the automotive device, the method comprising:

acquiring parameters relating to the trajectory of the automotive device and to a speed of said automotive device, calculating, using a computer, a control setpoint for each actuator, as a function of said parameters, using a controller, wherein the controller used varies as a function of the speed of the automotive device and comprises several components, including at least one state return gain to be applied to said parameters and at least one saturation compensation gain to be applied to a value of the control setpoint which was determined in a preceding iteration, and wherein the controller used is selected from several controllers, each of the several controllers being associated with a different curvature, and the controller used is selected as having a closest curvature from among the several controllers to a radius of curvature of the trajectory.

2. The control method as claimed in claim 1, wherein said automotive device is a vehicle comprising wheels, a power steering actuator, and a differential braking actuator, and the controller comprises several components for determining a control setpoint for said power steering actuator and a control setpoint for said differential braking actuator.

3. The control method as claimed in claim 2, wherein the controller can be written in the form of a sum of a plurality of products of a variable dependent on the speed and of a local controller independent of the speed.

4. The control method as claimed in claim 3, wherein each local controller is determined for a determined value of a vector of two varying (scheduling) parameters.

5. The control method as claimed in claim 4, wherein one of said two varying (scheduling) parameters is equal to the speed of the vehicle and the other of said two varying (scheduling) parameters is equal to an inverse of said speed.

6. The control method as claimed in claim 1, wherein the controller conforms to at least one saturation function being modeled per non-linear sector.

7. The control method as claimed in claim 6, wherein the saturation function conforms to a setpoint amplitude limiter model and can be expressed in the form:

$$\psi_1(x) = sat_\eta(K(\rho) \cdot x) - K(\rho) \cdot x, \text{ where}$$

K is the controller, $sat_\eta$ is an amplitude limiting function and x is a state vector of said automotive device comprising said parameters.

8. The control method as claimed in claim 6, wherein the saturation function conforms to a model limiting a variation in control setpoint and can be expressed in the form:

$$\psi_2(x) = sat_v(A_1 x + B_1 sat_\eta(K(\rho) \cdot x)) - (A_1 x + B_1 sat_\eta K(\rho) \cdot x),$$
$$\text{where}$$

K is the controller, $sat_v$ is an amplitude limiting function, A1 and B1 are predetermined matrices, and x is a state vector of said automotive device comprising said parameters.

9. The control method as claimed in claim 1, wherein the controller conforms to a modeling of said device in which one output to be minimized is a function of a trajectory-following error and of a heading angle error.

10. The control method as claimed in claim 1, wherein, with said automotive device being a vehicle comprising wheels, a power steering actuator, and a differential braking actuator, the control setpoint for said power steering actuator is calculated as a function of a control setpoint for said differential braking actuator which was determined in a preceding iteration, and/or the control setpoint for said differential braking actuator is calculated as a function of a control setpoint for said power steering actuator which was determined in a preceding iteration.

11. An automotive device comprising at least one actuator configured to influence the trajectory of said device and a computer configured to control said actuator, wherein the computer is configured to implement the control method as claimed in claim 1.

* * * * *